United States Patent [19]

Mallinson

[11] Patent Number: 4,867,521
[45] Date of Patent: Sep. 19, 1989

[54] MICROLENS MANUFACTURE

[75] Inventor: Stephen R. Mallinson, Ipswich, England

[73] Assignee: British Telecommunications public limited company, United Kingdom

[21] Appl. No.: 860,189

[22] Filed: Apr. 9, 1986

[30] Foreign Application Priority Data

Aug. 20, 1984 [GB] United Kingdom ............... 8421105

[51] Int. Cl.$^4$ .................................................. G02B 6/32
[52] U.S. Cl. .................................... 350/96.18; 350/320
[58] Field of Search ............... 350/96.18, 96.20, 320, 350/416, 417, 447, 482, 483, 413; 156/158

[56] References Cited

U.S. PATENT DOCUMENTS

| 4,269,648 | 5/1981 | Dakss et al. ............... 350/96.18 X |
| 4,304,461 | 12/1981 | Stewart et al. .................. 350/96.18 |
| 4,369,202 | 1/1983 | Verber et al. ......................... 427/8 |
| 4,378,954 | 4/1983 | Baker ............................ 350/96.20 X |
| 4,545,643 | 10/1985 | Young et al. ..................... 350/96.20 |
| 4,557,566 | 12/1985 | Kikuchi et al. ................. 350/416 X |
| 4,632,505 | 12/1986 | Allsworth ..................... 350/96.18 X |

FOREIGN PATENT DOCUMENTS

| 0078029 | 5/1983 | European Pat. Off. . |
| 3207988 | 9/1983 | Fed. Rep. of Germany . |
| 1429843 | 3/1976 | United Kingdom ............. 350/96.18 |

Primary Examiner—John D. Lee
Assistant Examiner—Phan T. Heartney
Attorney, Agent, or Firm—Nixon & Vanderhye

[57] ABSTRACT

A micro-optic lens is formed by making a lens element (20) having a length less than the required lens length. Adhesive (22) is attached to the rear of the lens element and a glass plate (21) attached to the adhesive. An optical fibre (26) is located against the plate (b 21), light is transmitted along the fibre, the beam emerging from the element (20) is sensed and the axial position of the plate (21) adjusted until the beam is sensed to be collimated. The adhesive (22) is then cured.

22 Claims, 1 Drawing Sheet

MICROLENS MANUFACTURE

This invention relates to microlenses.

Microlenses, for example rod type lenses or graded index (GRIN) type lenses, are used in a number of micro-optic devices eg. optical fibre-to-fibre connectors, fibre to device couplers, etc. When used in optical fibre systems an optical fibre is usually positioned at the rear focal plane of the lens which should coincide with the rear surface of an ideal lens so that light transmitted along the fibre emerges from the lens as a collimated beam. In practice, however, it has proved difficult to produce a conventional lens having the desired length which ensures that when the fibre is positioned against the rear surface the emerging light beam is optimally collimated.

The present invention aims to provide micro-optic lens having a desired length, and a method for producing such micro-optic lenses.

According to one aspect of the present invention there is provided a method of making a micro-optic lens which comprises forming a lens element having a length less than the required length, mounting another element relative to said lens element so that it defines a rear surface which can be moved axially relative to the front of the lens element, locating an optical fibre against said rear surface, transmitting light along said fibre, sensing the light beam emerging from the front of said lens element, adjusting the relative position of said front and rear surfaces until the emerging light beam is sensed to be collimated and fixing said elements in that position.

According to another aspect of the present invention, a micro-optic lens comprises a lens element and a non-focusing extension element extending the lens to an effective focal plane thereof.

The term "effective focal plane" herein shall be taken to mean a plane parallel and close to, or coinciding with, the nominal focal plane of the lens as would be calculated, for example, according to the well-known principles of ray optics.

In practice, the effective focal plane as determined by the optimum position for coupling an optical fibre, for example, to the lens lies usually a short distance beyond the nominal focal plane of the lens. The exact location of the effective focal plane will depend, inter alia, on the overall optical configuration (eg. the lens to lens spacing in an optical fibre connector). The present invention enables the manufacture, with a high degree of accuracy, of micro-optic lenses extended to the effective focal plane.

The other, or extension, element may comprise a drop of light transmitting, curable adhesive secured to the rear surface of the lens element and carrying at its rear a glass plate. The adhesive may be curable by exposure to UV radiation once said position has been located.

In an alternative arrangement the further element may comprise a sleeve located around the lens element, said sleeve being slidable relative to the lens element, and being securable thereto by adhesive when said position has been located.

The invention will be described now by way of example only with particular reference to the accompanying drawings. In the drawings.

Figure 1:
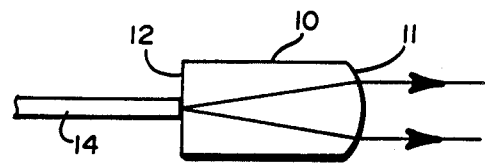
FIG. 1 is a schematic view illustrating a conventional rod lens.

Referring to FIG. 1, a rod lens 10 is made from glass or silica and has a curved front face 11 and a plain rear face 12. When used with optical fibres an optical fibre 14 is located so that its end face contacts the rear face 12 of the lens. Light transmitted along the fibre is formed into a collimated beam by the lens 10, the beam emerging from the front face 11 of the lens. In an ideal lens for the emerging beam to be a collimated beam the rear face 12 of the lens should coincide with the rear focal plane. In practice, not only is it difficult to manufacture conventional micro-optic lenses with the required degree of accuracy, but there are difficulties in establishing the precise length of lens required to achieve optimal coupling between lens and fibre, for example.

Figure 2:
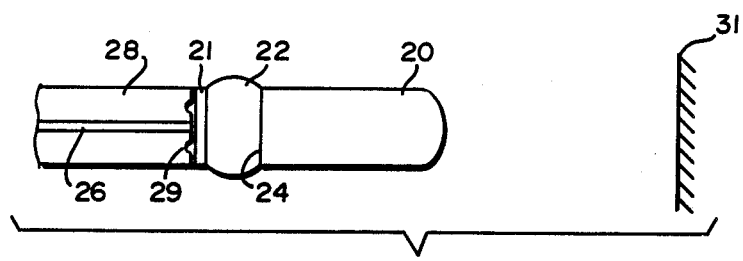
FIG. 2 is a schematic view illustrating the way in which a lens can be constructed in accordance with the present invention.

Turning now to FIG. 2, a micro-optic lens is produced in accordance with the present invention as follows. The initial step is to produce a rod type lens element 20 which has a length less than that of the required completed lens. This lens element 20 can be formed in a conventional manner from glass, silica or some other suitable transparent optical material of an appropriate refractive index.

A glass plate 21 is then attached to the lens element 20 by means of a drop 22 of light transmitting adhesive which is curable by ultraviolet light.

A suitable adhesive is Loctite 357, marketed by Loctite (Ireland) Ltd, Dublin, Eire. More generally, for a compound to be properly suitable for use with this method, it needs to cure substantially without shrinking into a transparent, non-scattering solid. The refractive index of the material is of less concern as the method will automatically compensate for variations in refractive index; provided of course the refractive index of the compound is substantially the same before and after curing.

Before the adhesive is cured it will be appreciated that the plate 21 can be moved toward and away from the rear face 24 of the lens element 20.

An optical fibre 26 in a suitable mounting 28 is then located against the rear surface of the glass plate 21. The mounting 28 has formed in its end face a circular groove 29 which is coupled to a vacuum pump. When the pump is operated the space in the groove 29 becomes evacuated and thus the member 28 and hence the fibre 26 are urged against the glass plate 21 by suction. The mounting 28 can be carried by an XYZ translation stage (not shown) to enable it to be moved precisely in any direction.

The fibre 26 is coupled to a light source and a mirror 31 located at a point spaced from the front surface of the lens element 20 so that its plane is perpendicular to the axis of the lens element. Light is transmitted along the fibre 26 so that it emerges from the lens 20, propogates towards the mirror 31, and is reflected back through the lens element and into the fibre 26. The returning light is coupled out from the fibre 26 by means of an X-coupler (not shown) and transmitted to a photodetector. The position of the glass plate 21 relative to the rear face 24 of the lens element 20 is then varied by operating the translation stage and the output of the photodetector is observed. When the output of the photodetector is at a maximum, the glass plate 21 is retained in that position and the adhesive cured by exposing it to ultraviolet radiation. When the adhesive is cured the glass plate is held firmly in position relative to the rear surface 24 of the lens element. It is assumed that when the photodetector output is at a maximum the light beam emerging from the lens element 20 is a collimated beam. Thus, it will be seen that by adjusting the position of the plate 21 relative to the lens element 20 until a maximum output is produced, and securing the plate in that position, it is possible to produce a lens element whose length is accurately determined to produce the required beam.

An alternative way of sensing the collimation of the beam is to measure the intensity profile of the emerging beam using a known technique such as a beam scanning arrangement. This is an arrangement well known to those skilled in the art and hence will not be described in detail.

I claim:

1. A method of making a micro-optic lens which comprises:
    forming a lens element having a convex front surface and a length less than its focal length,
    mounting a further optically transparent element rearwardly relative to the convex front surface of said lens element so that it defines a rear surface which can be moved axially relative to the front of the lens element,
    locating an optical fibre against said rear surface,
    transmitting light along said fibre,
    sensing the light beam emerging from the front surface of said lens element,
    adjusting the relative position of said front and rear surfaces until the emerging light beam is sensed to be collimated, and
    fixing said elements in that adjusted position.

2. A method as claimed in claim 1, wherein the further element comprises a drop of light transmitting, curable adhesive secured to the rear of the lens element and carrying at its rear a glass plate.

3. A method as claimed in claim 2, wherein the adhesive is curable by exposure to UV radiation once said position has been located.

4. A method as claimed in claim 1, wherein the further element comprises a sleeve located around the lens element, said sleeve being slidable relative to the lens element, and being securable thereto by adhesive when said position has been located.

5. A micro-optic lens made by a method as claimed in any one of the preceding claims.

6. A micro-optic lens comprising:
    a lens element and a rear optical element secured together on either side of a non-focussing extension element which composite three element structure extends a rear-most face of the rear optical element to an effective focal plane of the lens element,
    there being both an optical and mechanical connection between said lens element and said rear optical element.

7. A micro-optic lens comprising:
    a lens element and a rear optical element secured together on either side of a non-focussing extension element which composite three element structure extends a rear-most face of the rear optical element to an effective focal plane of the lens element;
    wherein the extension element comprises a curable compound in its cured state.

8. A micro-optic lens as claimed in claim 7 wherein the curable compound is light curable adhesive.

9. A method of making a micro-optic lens which comprises the steps of:
    providing a lens element (20) having front and rear surfaces, the length of the lens element being less than that required to provide a collimated light output from the front surface for a point input at the rear surface;
    mounting an extension element (21) to be axially movable relative to the lens element for defining an extended rear surface;
    locating an optical fibre (26) against the extended rear surface;
    transmitting light along the fibre;
    sensing the light transmitted from the front surface of the lens element;
    adjusting the relative position of the lens element and the extension element until the transmitted light is sensed to be collimated; and
    fixing the lens element and the extension element together in that final position.

10. A method as claimed in claim 9 comprising mounting at the rear surface (24) of the lens element (20) an extension element (21,22) including a drop of light transmitting, curable adhesive (22) carrying at its rear a glass plate (21) for defining the extended rear surface.

11. A method as claimed in claim 10 including fixing the lens element and extension element in the final position by curing the adhesive by exposure to UV radiation.

12. A method as claimed in claim 9 comprising mounting an extension element including a sleeve located around the lens element, said sleeve being slidable relative to the lens element, and being securable thereto by adhesive when the final position has been located.

13. A method according to claim 9 in which the locating step includes the steps of:
    providing a termination member (28) on the end of the optical fibre (26), the termination member having a groove (29) in its end face;
    coupling the groove to a vacuum pump;
    positioning the end face of the termination member at the extended rear surface; and
    evacuating the groove such that the fibre and termination member are urged against the extended rear surface by suction.

14. A method according to claim 13 in which the relative position of the lens element and the extension element is adjusted by moving the termination member on a translation stage whilst the termination member is being held against the extended rear surface by the suction.

15. A method according to claim 9 in which the sensing step includes the steps of:
    positioning reflecting means for reflecting transmitted light back to the front surface of the lens element;
    coupling reflected light out of the optical fibre into photodetector means for sensing the proportion of reflected light; and
    sensing that the transmitted light is collimated by determining when the proportion of reflected light is at a maximum.

16. A composite micro-optic lens structure comprising:
    a rear plate element of nominal thickness t and an actual thickness T;
    a micro-lens element having a forward convex end surface and a rear surface separated by a nominal distance d and an actual distance D which is less than the focal length of said convex end surface; and optical connection means attaching said rear place element opposite said rear surface of the micro-lens element by a separation distance S which has been adjusted in actual dimension for a specific said structure to make the total actual distance T+D+S substantially equal to the focal length of the assembled composite micro-optic lens structure such that light input to the rear plate element from an adjacent optical fibre end and passing successively through the rear plate element, connection means and micro-lens element is substantially collimated when it exits the convex and thereof, there being both an optical and mechanical connection between said micro-lens element and said rear plate element.

17. A composite micro-optic lens structure comprising:
   a rear plate element of nominal thickness t and an actual thickness T;
   a micro-lens element having a forward convex end surface and a rear surface separated by a nominal distance d and an actual distance D which is less than the focal length of said convex and surface; and
   optical connection means attaching said rear plate element opposite said rear surface of the micro-lens element by a separation distance S which has been adjusted in actual dimension for a specific said structure to make the total actual distance T+D+S substantially equal to the focal length of the assembled composite micro-optic lens structure such that light input to the rear plate element from an adjacent optical fibre end and passing successively through the rear plate element, connection means and micro-lens element is substantially collimated when it exits the convex end thereof;
   wherein said optical connection manes comprises a mass of light transmitting, curable adhesive optically and mechanically coupling said rear plate element to said rear surface.

18. A composite micro-optic lens structure as in claim 17 wherein said adhesive has been cured by exposure to UV radiation after measured adjustment of the distance S while the adhesive is still in an uncured state.

19. A composite micro-optic lens structure comprising:
   a lens element having a length D along an optical axis which terminates in a convex lens face having a focal length L, said length D being less than the focal length L of said lens face;
   an end element having a predefined optical face for optical coupling to an optical fibre; and
   a focal length compensation and coupling means of length S permanently interconnecting said end element to said lens element such that a fixed optical path of length L permanently exists between said optical face of the end element and said convex lens face.

20. A plurality of composite micro-optic lens structures as in claim 19 wherein the length S is different for each such composite structure even though their respective lens elements and end elements each have dimensions which are nominally equal.

21. A composite lens structure as in claim 19 wherein said lens element and end element have substantially right circular cylindrical cross-sections of substantially constant radii and wherein said focal length compensation and coupling means comprises a mass of UV-cured adhesive having a substantially circular cross-section of varying radial dimensions.

22. A method for manufacturing plural composite micro-optic lens structures where each is capable of accepting light input to one end thereof from an adjacent optical fibre end and of producing optimally collimated light therefrom at an opposite exit end of the composite lens structure even though the precise optical properties and focal length of incorporated lens components may materially vary from nominal specified values, said method comprising the following steps for each said composite structure:
   positioning an optical end element and a micro-lens element along an optical axis with an adjustable space therebetween which is occupied by an uncured but curable light-transmitting adhesive;
   coupling light from an adjacent optical fibre end into said elements;
   adjusting said space dimension along said optical axis while monitoring and optimizing the degree of light collimation achieved by the composite structure of said elements and the encompassed adhesive; and
   curing said adhesive in place so as to permanently affix said elements at a separation distance therebetween which optimizes said light collimation.

* * * * *